United States Patent [19]

Huang

[11] Patent Number: 5,075,972

[45] Date of Patent: Dec. 31, 1991

[54] CUTTING APPARATUS FOR HORTICULTURAL USE

[76] Inventor: Cheng-Chuan Huang, 33-15, 1-TEH S. Rd., Changhua, Taiwan

[21] Appl. No.: 661,393

[22] Filed: Feb. 26, 1991

[51] Int. Cl.[5] ........................ B26B 19/12; B26B 19/02; B26B 19/00

[52] U.S. Cl. ........................................ 30/216; 30/196; 30/223

[58] Field of Search ................. 30/196, 216, 221, 222, 30/223, 224, 371, 382; 83/90

[56] References Cited

U.S. PATENT DOCUMENTS

| | | | |
|---|---|---|---|
| 3,293,746 | 12/1966 | Maxson | 30/223 |
| 3,802,075 | 4/1974 | Taylor et al. | 30/216 |
| 4,216,582 | 8/1980 | Paule et al. | 30/216 |
| 4,619,045 | 10/1986 | Mayer | 30/216 |

*Primary Examiner*—Douglas D. Watts
*Assistant Examiner*—Paul M. Heyrana, Sr.
*Attorney, Agent, or Firm*—McGlew & Tuttle

[57] ABSTRACT

An improved cutting apparatus for horticultural use comprises a first cutting device, a second cutting device, and a retaining plate. The second cutting device has a plurality of second elongated holes disposed thereon serving as sliding rails on which rolling beads travel. The retaining plate comprises a plurality of through holes through which rolling beads are partially exposed. The retaining plate also comprises a plurality of elastic press pieces affixed thereto, with each of elastic press pieces having a press portion located at one end thereof for pressing the exposed portion of the rolling beads so as to ensure that first and second cutting devices make a reciprocating motion in a linear manner.

3 Claims, 4 Drawing Sheets

52 4 4 70 42 50 70 6 5 60 90 91 6 51 40 5 41 30

CUTTING APPARATUS FOR HORTICULTURAL USE

BACKGROUND OF THE INVENTION

The present invention relates to a cutting apparatus, and more particularly to a cutting apparatus designed for use in horticulture.

As shown in FIG. 1, the structure of a conventional cutting apparatus for use in horticulture comprises a first cutting device 10 and a second cutting device 14. The first cutting device 10 is of a long batten-like construction with toothed cutting parts 11 disposed across both lateral edges thereof and with a plurality of holes 12 arranged lengthwise at the positions coinciding with the axial line thereof. The end portion 13 of the first cutting device 10 is used to hinge thereto an actuator (not shown in FIG. 1). The second cutting device 14 is of a long batten-like construction and is arranged over the first cutting device 10. The second cutting device 14 has toothed cutting parts 15 disposed across both lateral edges thereof and has the first elongated hole 16 arranged at the position coinciding with the axial line thereof and corresponding to the hole 12 of the first cutting device 10. The end portion 17 of the second cutting device 14 is used to hinged thereto the driveshaft of an actuator. A retaining plate 18 of a U-shaped construction in its cross-section, which is placed over the second cutting device 14, has a plurality of holes 19 disposed therein at the positions corresponding to holes 12 of the first cutting device 10. The first and the second cutting devices 10 and 14 and the retaining plate 18 are held together by means of a plurality of bolts 20 and nuts 21. A sleeve 22 of a predetermined height is lodged in the first elongated hole 16 in order to maintain an appropriate gap between the retaining plate 18 and the first cutting device 10 so that there is a sufficient room for the second cutting device 14 to move axially in a reciprocating manner. As a result of the fact that the bolt 20 traverses the sleeve 22, the second cutting device 14 is capable of moving between the first cutting device 10 and the retaining plate 18 for a certain distance corresponding to the length of the elongated hole 16 upon an activation of the actuator, which will not be expounded here because it is a subject beyond the scope of this invention. Consequently, the cutting effect is brought about by the movement of the cutting parts 11 and 15 in an alternate manner.

The conventional cutting apparatus of prior art described above has inherent deficiencies of its own. In order to ensure that the first and the second cutting devices 10 and 14 move in a linear manner without deviation, the outer diameter of the sleeve 22 must be appropriately corresponding to the width of the elongated hole 16; otherwise a deviation of the prescribed course of movement of second cutting device 14 will take place, resulting in a servere mechanical friction between the sleeve 22 and the inner wall of the elongated hole 16. As a result, an undesirable noize is generated when the cutting apparatus of prior art is at work. In addition, the cutting effect of the apparatus is greatly compromised by virtue of a mechanical friction between the sleeve 22 and the elongated hole 16.

The first and the second cutting devices 10 and 14 of the prior art cutting apparatus are generally made of the heat-treated metals, which are vulnerable to bending and deformation. As a result, the first and the second cutting devices 10 and 14 are so often assembled improperly that there are unwanted gaps formed therebetween so as to permit the debris of the twig and the grass to deposit thereinto.

SUMMARY OF THE INVENTION

It is therefore the primary objective of the present invention to provide an improved cutting apparatus for horticultural use, which is capable of facilitating the cutting device thereof to maintain a linear movement in order to reduce the resistance brought about by a mechanical friction when it is at work.

It is another objective of the present invention to provide an improved cutting apparatus for horticultural use, which is devoid of gaps existing between cutting devices thereof.

In keeping with principles of the present invention, the primary objectives of the present invention are accomplished by an improved cutting apparatus for horticultural use, which comprises a first cutting device, a second cutting device, and a retaining plate. The second cutting device has a plurality of second elongated holes disposed thereon serving as sliding rails on which rolling beads travel. The retaining plate comprises a plurality of through holes through which rolling beads are partially exposed. The retaining plate also comprises a plurality of elastic press pieces affixed thereto, with each of elastic press pieces having a press portion located at one end thereof for pressing the exposed portion of the rolling beads so as to ensure that both first and second cutting devices make a reciprocating motion in a linear manner.

DETAILED DESCRIPTION OF THE PREFERRED EMBODIMENTS

Figure 1:
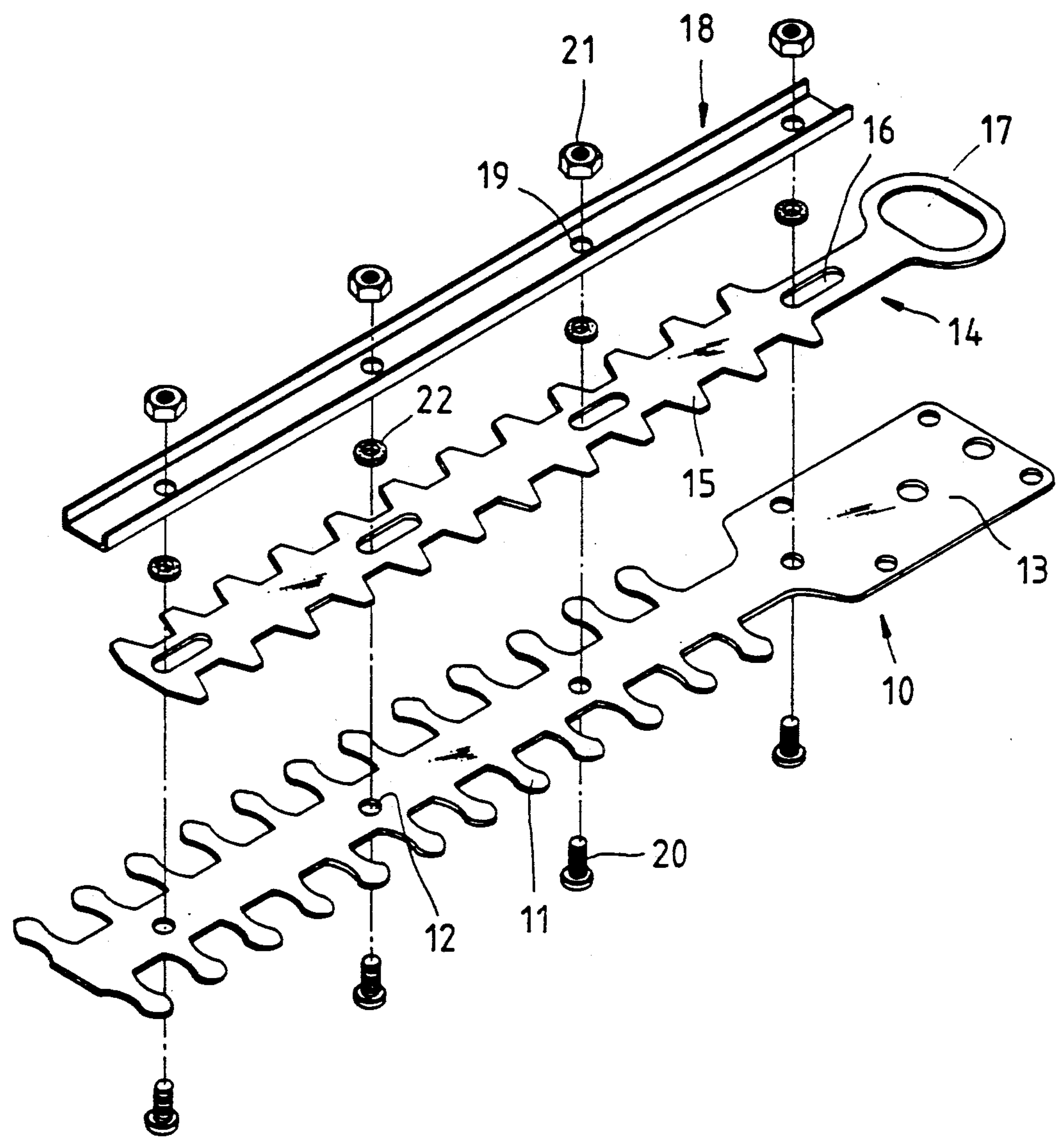
FIG. 1 shows an exploded view of the prior art.
Figure 2:
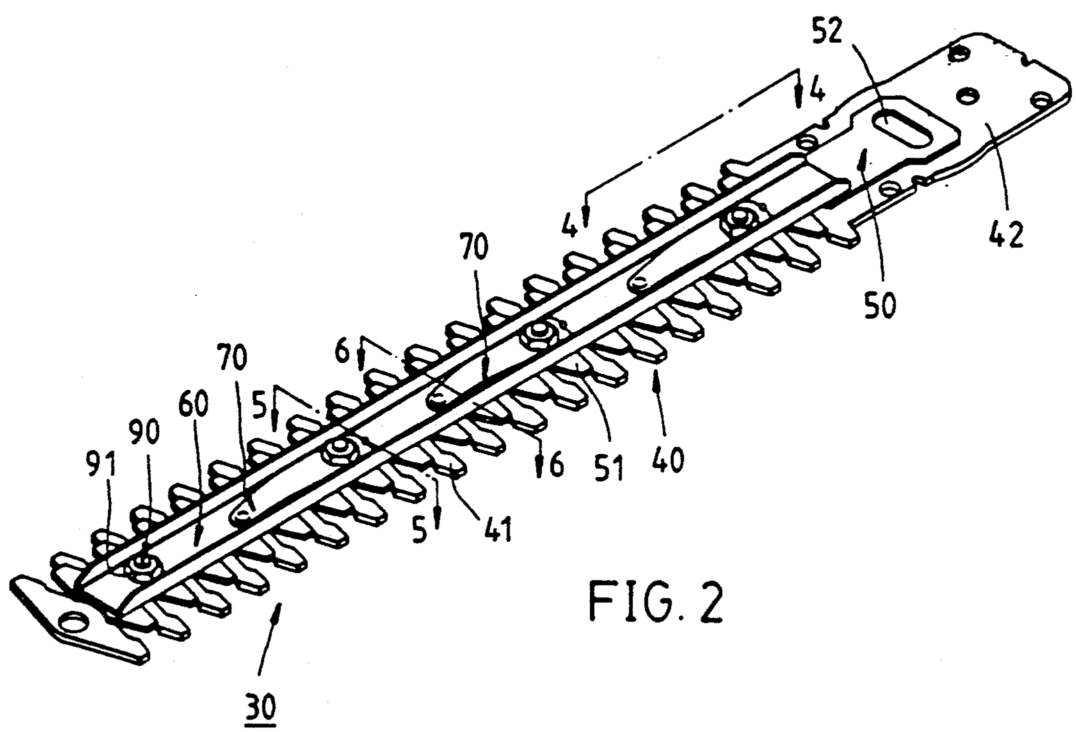
FIG. 2 shows a three-dimentional view of the preferred embodiment in formation according to the present invention.
Figure 4:
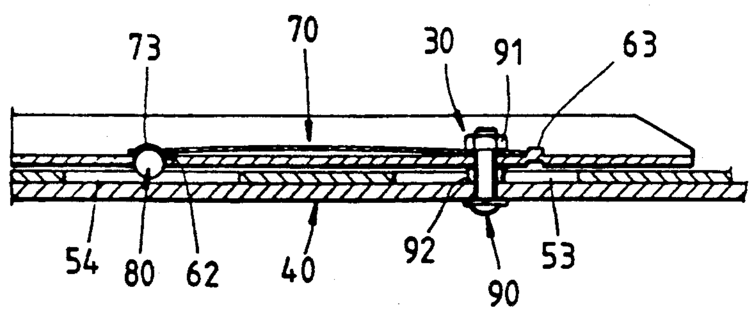
FIG. 4 shows a cut-away view of a portion taken along the line 4—4 as shown in FIG. 2.

Referring to FIGS. 2-6, the cutting apparatus 30 embodied in the present invention is shown comprising a first cutting device 40, a second cutting device 50, a retaining plate 60, three elastic press pieces 70, and three rolling beads 80.

The first cutting device 40 of a long batten-like construction comprises a section having toothed cutting parts 41 arranged across both lateral edges thereof and a section designated as lock portion 42 whereby an actuator (not shown) is hinged thereto. In addition, four through holes 43 are arranged lengthwise at equal intervals at the positions coinciding with the axial line of cutting parts 41.

The second cutting device 50 of a long batten-like construction has a width slightly smaller than that of the first cutting device 40 and a section having toothed cutting parts 51. Located at one end of the second cutting device 50 is an elliptical hole 52 for use in hinging the driveshaft of an actuator to the cutting apparatus 30. Four first elongated holes 53 are constructed on the second cutting device 50 at the positions corresponding to through holes 43 of the first cutting device 40. In addition, there are three second elongated holes 54, which are arranged alternatively with the four first elongated holes 53 on the second cutting device 50. Each of the second elongated holes has a width which is smaller than the outer diameter of each of the rolling beads 80.

The retaining plate 60 is of a batten structure with a U-shaped cross section and is lodged on the axial line of the second cutting device 50. The retaining plate 60 has four first holes 61 constructed thereon at the positions corresponding to through holes 43 of the first cutting device 40. Additionally, the retaining plate 60 has three second holes 62 arranged thereon at the positions corresponding to second elongated holes 54 of the second cutting device 50. The diameter of each of second holes 62 is smaller than outer diameter of each of rolling beads 80. Furthermore, the retaining plate 60 has three protrusions 63 disposed thereon in the vicinity of first holes 61.

The elastic press piece 70 has a lock hole 71 disposed thereon at one end thereof and a concavity 72 located at the edge of one end thereof. Located at the other end of the elastic press piece 70 is an upwardly concave press portion 73.

The components mentioned above are held together in formation of a cutting apparatus 30 by means of four nuts 91 and four bolts 90 traversing respectively the through holes 43 of the first cutting device 40, first elongated holes 53 of the second cutting device 50, and first holes 61 of the retaining plate 60. A sleeve 92 is lodged in each of first elongated holes 53 of the second cutting device 40 in order to maintain an appropriate gap between first cutting device 40 and retaining plate 60 so as to facilitate an appropriate movement of second cutting device 50. The height of the sleeve 92 must be slightly greater than the thickness of second cutting device 40. However, the outer diameter of the sleeve 92 must be smaller than the width of the elongated hole 53. The sleeve 92, the press piece 70, the retaining plate 60, the second cutting device 50, and the first cutting device 40 are held together by means of bolts 90 and nuts 91. It must be emphasized here that the press piece 70 is affixed to the retaining plate 60 in such a manner that each of protrusions 63 is caught securely in concavity 72 so as to ensure that press piece 70 is positioned securely in place. In addition, the second hole 62 of the retaining plate 60 is covered by the press portion 73 of press piece 70.

The cutting apparatus 30 embodied in the present invention is characterized in that it has rolling beads 80 sandwiched between second elongated holes 54 of the second cutting device 50 and second holes 62 of retaining plate 60. As mentioned previously, the outer diameter of rolling beads 80 is greater than width of second elongated hole 54 and diameter of second hole 62. Therefore, rolling beads 80 are received on the rim of second elongated holes 54 while portion of rolling beads 80 is exposed through second holes 62 to be covered by press portion 73 of press piece 70.

Figure 5:
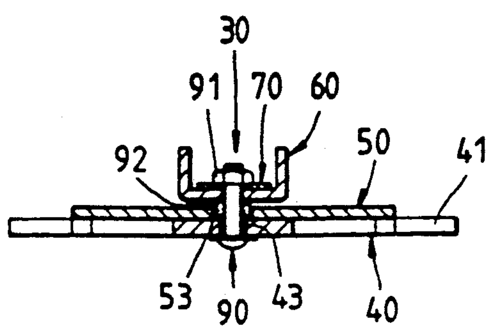
FIG. 5 shows a cut-away view of a portion taken along line 5—5 as shown in FIG. 2.
Figure 6:
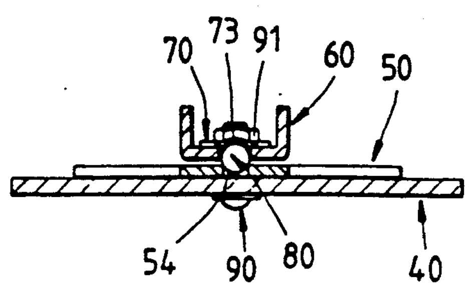
FIG. 6 shows a cut-away view of a portion taken along line 6—6 as shown in FIG. 2.
Figure 3:
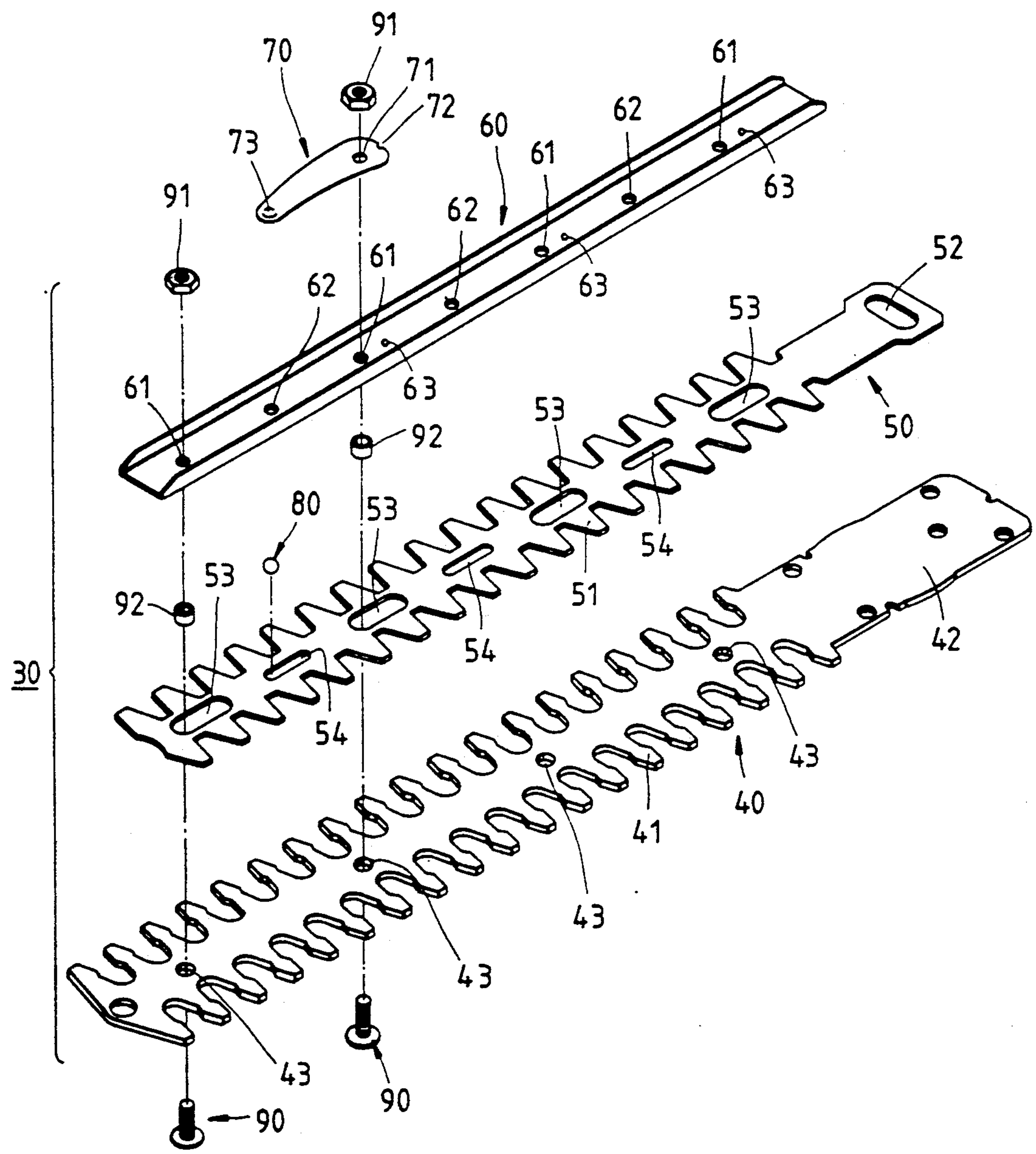
FIG. 3 shows an exploded view of the preferred embodiment of the present invention.

Upon being activated by driveshaft of an actuator, the second cutting device 50 begins making a reciprocating movement within a range corresponding to length of elongated holes 53. As a result, the cutting effect of the cutting apparatus 30 is brought about by the movement of cutting parts 41 and 51 in an alternate manner. As rolling beads 80 are being pressed by press pieces 70, they will travel along the confines of second elongated holes 54 in a reciprocating manner as long as cutting apparatus 30 is at work. The movement of rolling beads 80 as such ensures that both first and second cutting devices 40 and 50 move in a linear manner. In addition, the tension generated by elastic press pieces 70 makes first and second cutting devices 40 and 50 to stay closely together to prevent debris of the twig or the grass from depositing in the space located between first and second cutting devices 40 and 50. Furthermore, the mechanical friction between the sleeve 92 and the first elongated hole 53 is effectively averted, because the outer diameter of the sleeve 92 is smaller than the width of first elongated hole 53, as shown in FIG. 5.

Figure 7:
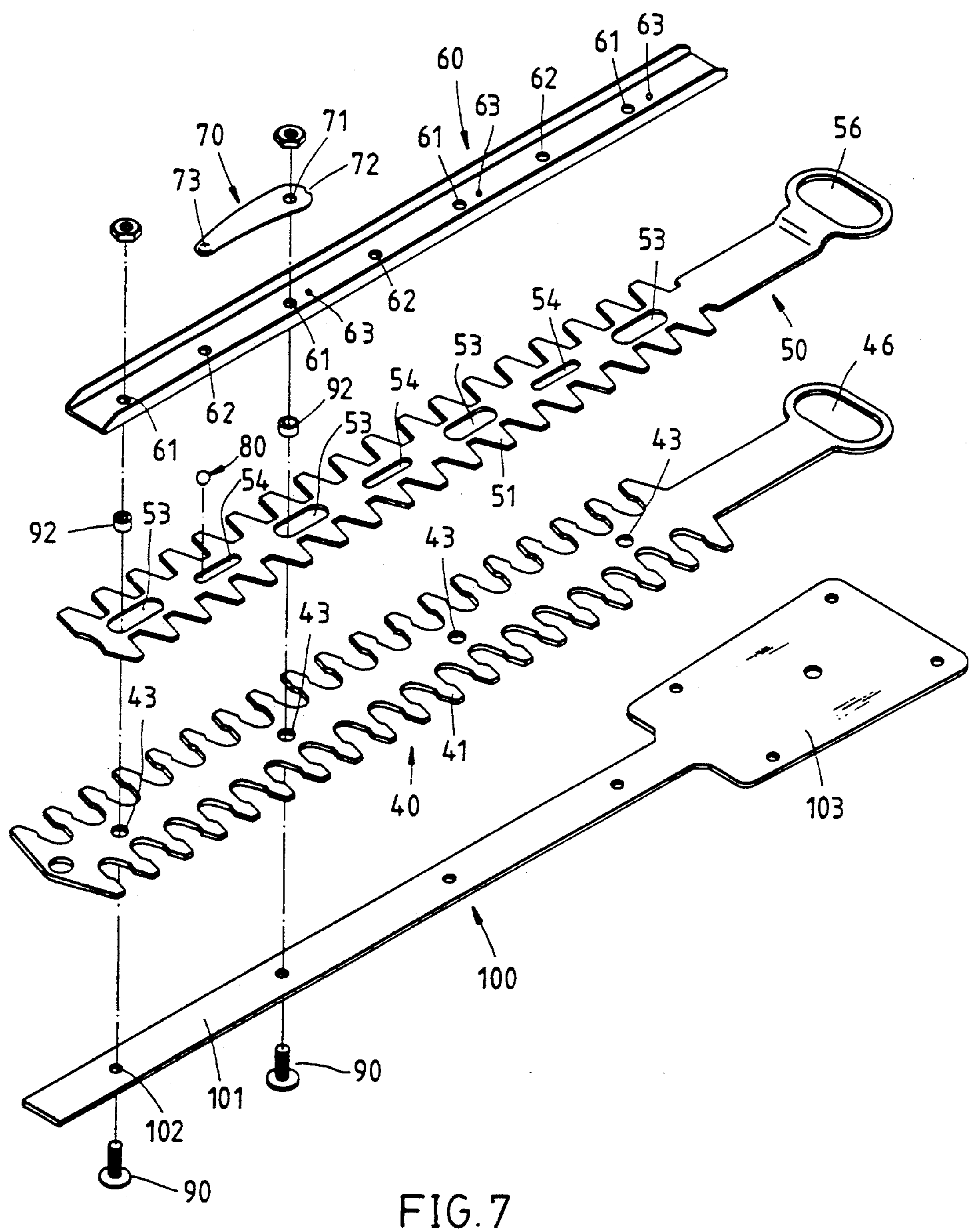
FIG. 7 shows an exploded view of another preferred embodiment of the present invention.

Now referring to FIG. 7 showing another embodiment of the present invention, the cutting apparatus 30 is shown comprising a first cutting device 40 with a seat plate 100 attached thereunder. The front end portion 101 of the seat plate 100 has a hole 102 disposed thereon for accommodating a bolt 90. The rear end portion, which is wider than the front end portion 101, is designated as a plate body 103 for use in fastening an actuator. Located respectively at rear end of first cutting device 40 and of second cutting device 50 is an elliptical hole 46 and an elliptical hole 56 for receiving two eccentric wheels (not shown) having a difference of 180 degrees, so as to ensure that first and second cutting devices 40 and 50 are capable of making a reciprocating motion to bring about the cutting effect of the cutting apparatus 30.

What is claimed is:

1. An improved cutting apparatus for horticultural use, comprising:

(a) a first cutting device of a long batten-like construction, which includes a section having toothed cutting parts arranged across both lateral edges thereof and a plurality of through holes arranged lengthwise at equal intervals at the positions coinciding with the axial line of said cutting parts;

(b) a second cutting device of a long batten-like construction, which includes a section having toothed cutting parts arranged across both lateral edges thereof and a plurality of first elongated holes arranged lengthwise at equal intervals at the positions coinciding with the axial line of said cutting parts;

(c) a retaining plate lodged on the axial line of said second cutting device, said retaining plate having a plurality of first holes disposed thereon at the positions corresponding to said through holes of said first cutting device;

(d) a plurality of sleeves of a predetermined height, each of said sleeves being lodged in said first elongated hole of said second cutting device;

(e) a plurality of bolts traversing said through holes, said sleeves, and said first holes;

(f) a plurality of nuts;

(g) a plurality of rolling beads, which have outer diameter greater than the diameter of second holes of said retaining plate and are lodged in the second elongated holes of said second cutting device in a manner that they are partially exposed through said second holes of said retaining plate; and (h) a plurality of elastic press pieces with a lock hole disposed thereon at one end thereof and a press portion located at other end thereof.

2. An improved cutting apparatus for horticultural use in accordance with claim 1, wherein said second elongated holes of said second cutting device have a width smaller than outer diameter of said rolling beads.

3. An improved cutting apparatus for horticultural use in accordance with claim 1, wherein said retaining plate further comprises protrusions disposed thereon in the vicinity of said first holes, and wherein said elastic press piece further comprises a concavity located at the edge of one end thereof.

* * * * *